US005456325A

United States Patent [19]

Pantermuehl et al.

[11] Patent Number: 5,456,325

[45] Date of Patent: Oct. 10, 1995

[54] METHOD AND APPARATUS FOR DRIVING A PROBE INTO THE EARTH

[75] Inventors: Pontie J. Pantermuehl, Seguin; Donald H. Heihn, San Antonio; Thomas E. Owen, Helotes, all of Tex.

[73] Assignee: Southwest Research Institute, San Antonio, Tex.

[21] Appl. No.: 232,708

[22] Filed: Apr. 19, 1994

[51] Int. Cl.[6] .......... E21B 7/124; E21B 25/18; E21B 7/24

[52] U.S. Cl. .......... 175/6; 175/55; 175/58

[58] Field of Search .......... 175/6, 20, 55, 175/58, 321, 403; 166/243

[56] References Cited

U.S. PATENT DOCUMENTS

| | | | |
|---|---|---|---|
| 2,684,857 | 7/1954 | Chrimacker | 279/121 |
| 2,982,557 | 5/1961 | Anschutz | 279/57 |
| 3,076,245 | 2/1963 | Acker | 279/4.08 |
| 3,083,025 | 3/1963 | Herbkersman | 279/122 |
| 3,199,614 | 8/1965 | Bodine, Jr. | 175/55 X |
| 3,278,193 | 10/1966 | Groner et al. | 279/4.09 |
| 3,530,947 | 9/1970 | Gendron | 175/55 |
| 3,714,996 | 2/1973 | Dane, Jr. | 175/6 |
| 3,760,469 | 9/1973 | Brown | 81/57.18 |
| 3,820,346 | 6/1974 | Wisotsky | 405/228 |
| 3,921,500 | 11/1975 | Silcox | 91/4 R |
| 3,957,079 | 5/1976 | Whiteman | 137/596.18 |
| 3,992,019 | 11/1976 | Crawshay | 403/316 |
| 4,116,453 | 9/1978 | Andre | 279/4.06 |
| 4,196,914 | 4/1980 | Kutman et al. | 279/4.02 |
| 4,432,559 | 2/1984 | Rasmussen | 279/4.07 |

FOREIGN PATENT DOCUMENTS

| | | | |
|---|---|---|---|
| 424961 | 9/1974 | U.S.S.R. | 175/6 |

*Primary Examiner*—David J. Bagnell
*Attorney, Agent, or Firm*—Charles W. Hanor

[57] ABSTRACT

A remotely actuated clamping apparatus for obtaining a secure coupling between a vibration unit generating longitudinally directed driving forces and a probe designed for penetrating the earth, such as into underwater sediments at water depths too great for direct human intervention.

11 Claims, 3 Drawing Sheets

METHOD AND APPARATUS FOR DRIVING A PROBE INTO THE EARTH

BACKGROUND OF THE INVENTION

1. Field of the Invention

The present invention relates to the driving of core samplers or probes into the earth for obtaining data in mineral exploration, scientific research, etc., more particularly, the present invention relates to the driving of said devices into bottom formations of deep lakes and oceans.

2. General Background

Much information concerning the geological past of a given location is contained in the sequences of layers of sediments laid down on the bottoms of lakes and oceans. A considerable portion of that information can be obtained if relatively undisturbed cores of that bottom sediment can be retrieved, showing the local progression of sediment types and co-deposited biological specimens, plus scientifically derivable information on specific mineralization, rates of deposition, etc. In areas in which much of the above is already well established, considerable data, especially that related to thickness of various depositions, may be obtained by an instrumented probe, with no core collection required.

One common way of operating both instrumented probe and core sampling devices (hereafter collectively referred to as "probe") is thrusting a long, relatively slim, device into the earth to at least the depth under investigation. Predrilling to facilitate insertion of the probe is not advisable since an object is either to obtain an undisturbed core or a clear signal of transition from one deposition layer to the next, both of which could be destroyed by pre-drilling and its resultant mixing of materials from all levels, spread along and pressed into the walls of the hole.

Therefore, the probe may be driven into undisturbed bottom formations by one of the following methods. The probe may be inserted by hand if it is small, short, and the material is not too hard. The probe may also be driven in by a hammering action. The probe may also be inserted by some heavy mechanical means such as a hydraulic or jacking device. Note that the second and third methods may be accomplished in relatively shallow water by energizing devices on the surface acting on the top of probes long enough to reach the desired depth. Of course, a depth limit is reached in which the slender unsupported section of the probe in the water column will bend rather than penetrate. At such greater depths, the unit must be self-contained, in that the driving unit accompanies the probe to the bottom. The probe may also be dropped or fired into the formation for ballistic penetration. The probe may also be excited by a vibrator to create small, high frequency, vibratory displacements which result in partial fluidization of the formation material in direct contact with the probe. Such fluidization reduces the friction between the material and the probe surfaces, allowing it to sink into the bed sediments under the influence of its own weight. This invention is relevant to the latter vibratory method of penetration and is particularly applicable in achieving controlled penetration to relatively deep depths and/or under remote operating conditions, such as in deep water, where manned operation or diver access is impractical.

Known methods of sediment penetration typically provide penetration depths to about 20 feet. Hence, practical operation is possible by attaching a vibrator module in a fixed manner at the top end of the probe.

Thus, for probe lengths of 20 feet or less, full penetration may be accomplished without readjusting the vibrator position. For deeper penetration, the vibrator module may be clamped at intermediate positions on the probe riser pipe and moved upward as the probe penetrates into the sediments. In shallow water applications, this process may be accomplished by divers who adjust the vibrator position by means of a manual mechanical clamping arrangement. In deep water, a remotely operated clamping mechanism may be needed to replace this manual operation.

The sediment penetrating component may be a hollow pipe or tube when core samples are to be taken, and may have a solid, cylindrical form in the case of an instrumented probe. Such probes usually are attached to a hollow tube (riser pipe) of the same diameter to increase their effective length. If even greater length is required, additional riser pipes may be added.

A vibrator module is clamped onto the probe in such a way that strong vibrations may be imparted without slippage and without distorting or damaging the probe or tube. The clamping force required to attach the vibrator depends upon the dynamic force generated by the vibrator and the coefficient of friction at the clamping grip. The basic design objective and operational requirement of the vibrator and clamping mechanism is to mechanically drive the probe in longitudinal oscillatory motions having an amplitude in the range of approximately ±2 mm (±0.08 in), or greater. This amplitude is sufficient to break much of the sediment contact friction on the probe surface.

The effective weight of the probe/vibrator assembly should be on the order of several hundred pounds in order to penetrate efficiently into underwater sediments. A typical vibrator mechanism might consist of two electric-motor-driven counter-rotating eccentric flywheels mounted in waterproof housings in a frame which positions the rotating masses on opposite sides of the cylindrical probe body. The eccentric rotors produce rotating centrifugal forces which, through the common mounting frame, seek their natural rotary synchronization within a few revolutions after being energized. Thereafter, the counter-rotating flywheels produce longitudinal oscillatory forces at the rotational frequency of the drive motors which, by proper clamping, can be coupled to the probe riser pipe.

The displacement of the vibrating probe is proportional to the longitudinal force imparted by the vibrator and inversely proportional to the mass of the probe/vibratory assembly and the square of the vibration frequency. Thus, for a given force (proportional to the vibrator power rating), the probe mass and rotational frequency must be designed or adjusted to produce the nominal ±2 mm (0.08 in.) displacement necessary for low-friction penetration. For example, the vibrator mechanism used in a recent prototype design was powered by two 2-hp electrical motors driving eccentric rotors that produced a peak oscillatory force of approximately ±7,000 lbf at a frequency of 3,600 rpm (60 Hz). For a probe/vibrator assembly mass of 300 lbs., the corresponding peak displacement was $$D = \frac{\pm 7{,}000(12)(32.17)}{4(3.1416)^2(60)^2(300)} = \pm 0.063 \text{ in. } (\pm 1.58 \text{ mm}).$$

The penetration resistance of the probe can be made relatively independent of the penetration depth by designing the probe to have its lower end section larger in diameter than that of the upper riser pipe. With this design, only the larger diameter section of the probe governs the main penetration resistance and the probe can penetrate into the sediment to a depth limit governed primarily by the stiffness of the sediment material. This depth capability is estimated to be on the order of 100 feet for the 2-hp prototype vibrator probe system.

An object of the present invention is to provide a device that can be firmly clamped to a probe underwater, without the aid of a diver.

Another object is to provide a device which can be released, repositioned and reclamped on a probe from the surface in water too deep for safe diver operations.

Another object of this invention is to provide a clamping device combining high clamping force with simplicity, minimum size and weight, and with the low probe damage potential of collet-type clamps.

SUMMARY OF INVENTION

The present invention comprises an apparatus and method including electrically or hydraulically powered vibratory means, an earth sampling device or probe, and a hydraulically actuated clamping device mounted together in such a relationship that the vibratory unit may be solidly locked to the probe unit at any location along its length, released, relocated, and reclamped at a new position from a remote location. It is specifically targeted for use in sampling deep underwater sediments as in a seafloor location.

During operation, the driving (or vibratory) unit applies its forces chiefly in a longitudinal direction along the center line of the earth-penetrating probe to which it is clamped, inducing an end-extensional driving action in that probe.

Upon driving the probe into the sediments until the driving unit nears contact with said sediments, the clamp unit/drive unit assembly may be disengaged from the probe by releasing the hydraulic pressure used to maintain clamping force.

Said assembly may then be moved upwardly on the probe and/or riser pipe extensions to the next desired location by means of a hoist line attached to said assembly, and may be reclamped by reapplication of said hydraulic pressure. The source of hydraulic pressure and the lifting/lowering action of the hoist line is usually on board a vessel at the surface.

When additional probe length is required, it may be obtained through adding riser pipes to the probe assembly by means of conventional threaded connections.

The present invention overcomes the depth limitation imposed on previous vibrator-to-probe clamping systems which were limited to depths accessible to a human diver, since it may be disengaged, relocated, and re-engaged quickly and efficiently from the surface, even in deep water.

DETAILED DESCRIPTION OF THE PREFERRED EMBODIMENT

Figure 1:
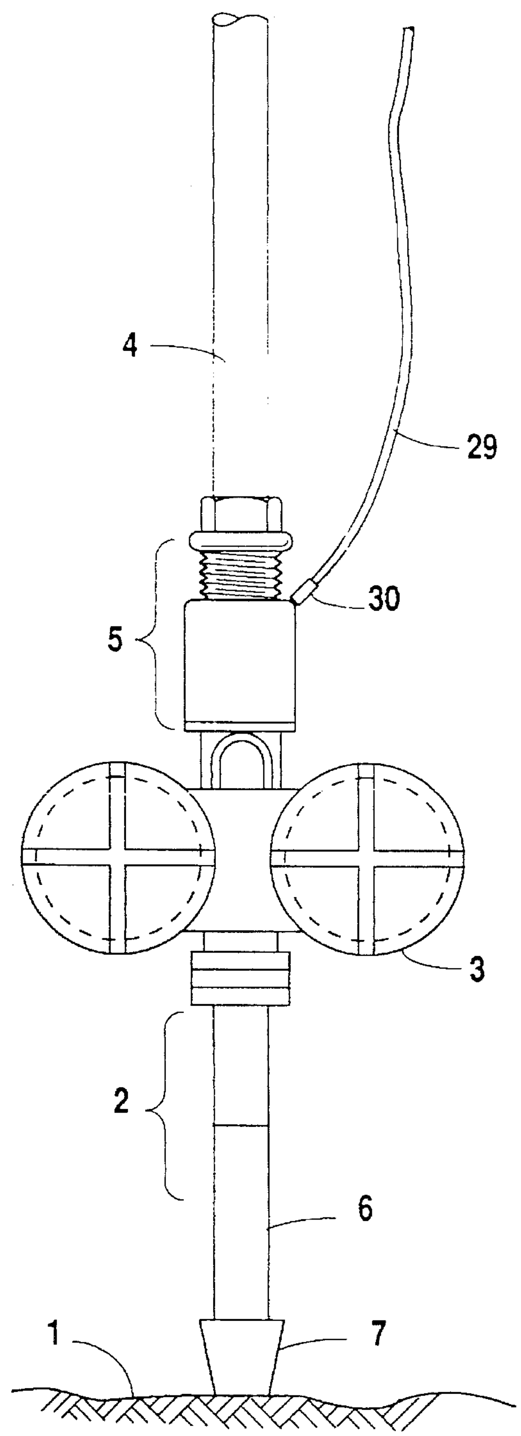
FIG. 1 is a schematic elevational view of an assembly of the vibration unit, the clamping device and the probe standing on the seafloor prior to any penetration.
Figure 2:
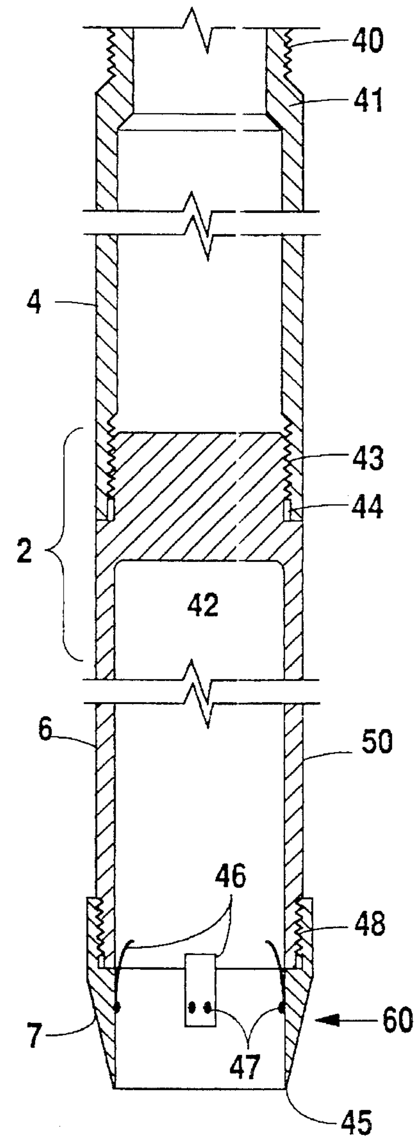
FIG. 2 is a partial vertical sectional view of FIG. 1.

The preferred embodiment of the present invention shown in the drawings includes an apparatus having a motor-driven vibratory unit 3 rigidly attached to clamping device 5, both of which are fitted around the probe unit 2 resting on seafloor 1, prior to penetration into said seafloor. In particular, the probe unit 2 illustrated here consists of a coring or instrumented head section 6, connected at its top end to an upward extension of the probe (or riser pipe) 4 and at its bottom end to a conventional penetration aid shoe 7. Coring barrel 6 and riser pipe 4 are preferably of the same diameter, so that the vibrator 3/clamp 5 assembly may freely slide without obstruction over the entire length of probe 2 (above the locally enlarged shoe 7, sometimes used to reduce wall friction in deep holes). Additional length may be achieved by adding additional riser pipes 4. Riser pipe 4 has female threads 44 on its lower end to match male threads 43 on the upper end 42 of coring unit 6. Riser pipe 4 also has matching male threads 40 on its internally upset section 41 on its upper end. Therefore an additional section of riser pipe identical to riser pipe 4 shown may be used to extend the length of the riser pipe attached to unit 2 while maintaining a uniform diameter outer surface from shoe 7 upward.

Shoe 7 is shown in this unit with typical features; a sharp edge 45 to reduce force required for penetration and minimize disruptive forces affecting the core; a tapered outside diameter 60 somewhat larger than that of coring unit 6 and thread 48 by which shoe 7 is connected to coring unit 6 which results in reduced wall friction between the penetrated sediments and the outer walls of probe unit 2 upon being driven into the seafloor.

Shoe 7 contains a multiplicity of flexible gripper springs 46 attached by fasteners 47. Said grippers flex to allow passage of a core thereby, but resist its withdrawal by digging into the core sides all around when probe unit 2 is retrieved. This breaks off the soft core at or near said gripper springs 46 and the core within core barrel 50 is retained within probe unit 2.

Unscrewing shoe 7 at threads 48 removes gripper springs 46 and the core may be slid out of coring unit 6. Probe unit 2, shown in coring configuration may become an instrumented probe if a more or less solid unit with a solid point is substituted for coring unit 6. In this latter case, instrumentation leads inside riser pipes 4 would connect this probe unit to the surface.

Figure 4:
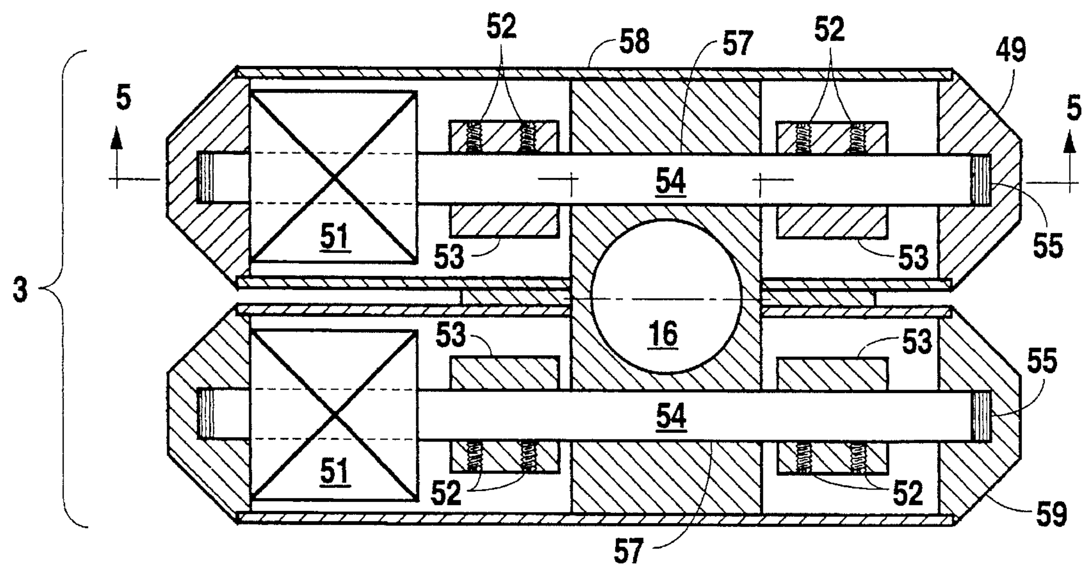
FIG. 4 is a horizontal sectional view of the vibration inducing unit of FIG. 3. The view is taken along plane 4—4.
Figure 5:
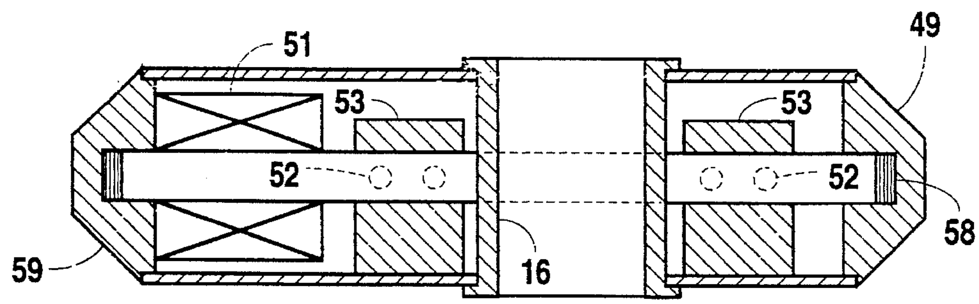
FIG. 5 is a side view taken at the plane 5—5 of FIG. 3.
Figure 6:
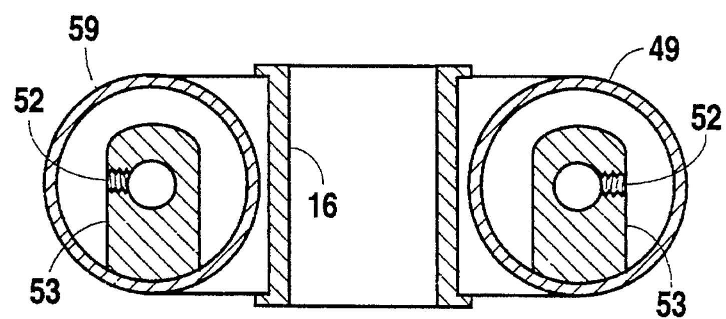
FIG. 6 is an end view of FIG. 3.

FIGS. 4–6 show a vibration inducing unit 3 suitable for use in this invention. A steel or cast aluminum frame 58 containing a centrally located sleeve section 16 serves as a liquid tight housing with the addition of end caps 49 and 59.

The housing thus formed contains bearing bores 55 in the said end caps and bores 57 in frame 58. Said bores are located in alignment to receive two shafts 54 in parallel relationship, equidistant from and perpendicular to sleeve 16. Aforesaid bearings allow shafts 54 to be captured against excessive endplay and easily rotated about their longitudinal centerlines.

Equally spaced along the lengths of shafts 54 from the center of sleeve 16, four eccentric weights 53 are locked to said shafts by fasteners 52. Care must be given to insure that the center of gravity of both eccentrics 53 lie in the same plane on the same side of each shaft 54. All four centers of gravity lie in vertical planes through the centerlines of shafts 54. (It is understood that the second eccentric 54 lies directly behind the one shown in this view.)

Motive force to rotate this system is supplied by counter-rotating electric motors 51. Counter-rotating hydraulically powered motors may also be used. Said motors are attached either to housing 58 or to end plate 59 to supply the torque reaction required to rotate shafts 54.

Thus one motor 51 drives clockwise while the second motor 51 drives counter-clockwise. The direction of rotation of either particular motor is immaterial because all forces other than longitudinal are cancelled by the presented arrangement. Lateral forces resulting from rotating unbalanced masses will be equal and opposite while they are fixed in this relationship, while longitudinal forces (up and down in FIG. 5) will be additive.

Power lines (not shown) enter the unit at any convenient location that can be rendered water-tight. The power lines would most conveniently be bundled with the hoist line (not shown) used for suspending and relocating the clamp 5/vibrator unit 3 assembly. Hydraulic hose 29 supplying power for clamping unit 5 may also be bundled with said lines.

Figure 3:
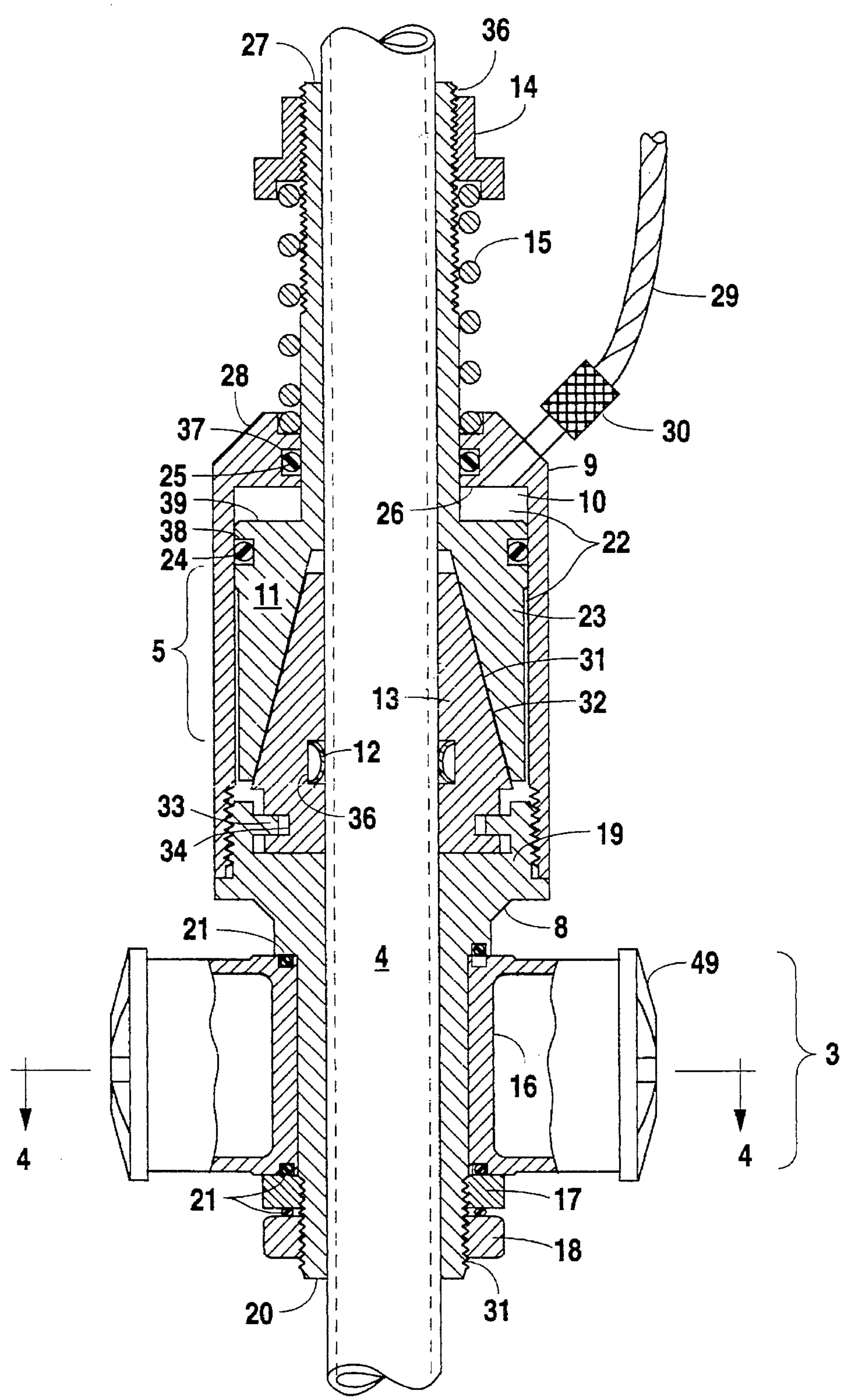
FIG. 3 is a cross-sectional view of the riser pipe clamping device.

FIG. 3 is a sectioned view of clamping device 5 and illustrates one way in which the objects of the present invention may be achieved.

Probe unit 2 in FIG. 1 is attached to the lower end of riser pipe 4 and vibratory unit 3 is shown without internal detail except for its mounting sleeve 16, since its particular mode of construction is immaterial so long as it is capable of producing strong, high frequency longitudinal forces to achieve longitudinal vibrations in probe unit 2 when said probe is rigidly clamped to said vibratory unit 3. In FIGS. 1 and 3, this rigid but easily released connection between riser pipe 4 and vibratory unit 3 is supplied by clamping device 5.

Clamping device 5 consists of a main body unit 8 having a reduced diameter lower extension 20 which extends through closely fitting sleeve 16, an integral part of the frame of vibratory unit 3. Vibratory unit 3 and clamping device 5 are rigidly coupled together when clamp nut 17 and jam nut 18 are tightened on threads 31 at the lower end of clamp body extension 20. O-Rings 21 installed as shown at the contact areas between clamp body 8 and sleeve 16, sleeve 16 and clamp nut 17, and clamp nut 17 and jam nut 18 will exclude water and possible corrosion effects in the closely fitting elements of this coupling system. Water entrance along the threads of clamp nut 17 and jam nut 18 is prevented by use of a thread sealing compound applied to the matching threads 31 of clamp body extension 20, resulting in a watertight connection.

In FIG. 3 the clamp cylinder housing 9 is shown connected to main body unit 8 by threads 19.

Within the cavity 22 formed by connecting main body unit 8 to cylinder housing 9 lie a multiplicity of clamp fingers 13 and the enlarged head section 23 of piston 11. Piston 11 contains an O-Ring seal 24 mounted in groove 38 helping to form an oiltight cavity 10 between the piston head upper surface 39 and the top inner surface 26 of housing 9 which also contains a second O-Ring seal 25 mounted in groove 37 between the upper extension 27 of piston 11 and the upper inward flange 28 of housing 9. When high pressure hydraulic fluid is introduced into cavity 10 through hose 29 and quick-connect coupling 30, a force is created moving piston 11 down over clamp fingers 13. Both piston 11 and fingers 13 are manufactured with matching tapers 31 of piston 11 and 32 of fingers 13 so that downward movement of piston 11 exerts forces tending to squeeze fingers 13 tightly against riser pipe 4 around its circumference. Fingers 13 have been manufactured with sufficient side clearances to allow this action without causing mutual interference. Once they are firmly clamped about riser pipe 4, they are prevented from moving up by both the downforce exerted by piston 11 and by a groove and projection arrangement. This system consists of an annular inwardly directed projection 33 of clamp body 8 matched by grooves 34 in clamp fingers 13 with a very loose radial fit so that inwardly and outwardly directed motion of fingers 13 can take place with minimum up and down (longitudinal) motion. After clamping, clamp fingers 13 are pressed solidly down against clamp body 8 so that further motion in that direction is precluded, as is lateral motion since the fingers 13 fit tightly within the annular taper 31 of piston 11 and piston 11 fits tightly within clamp housing 9.

Piston 11 has an upwardly directed extension 27 with threads 36. Heavy spring 15 is fitted over extension 27 and compressed by nut 14 screwed down over said threaded extension until the desired reaction force is exerted by spring 15 between cylinder housing 9 and nut 14. As can be seen in FIG. 3, in the absence of hydraulic pressure in cavity 10, the force of spring 15 will close cavity 10 until the piston 11 head upper surface 39 rests against the inner top 26 of clamp housing 9.

Fingers 13 cannot follow piston 11 in its upward movement, since they are restrained by the groove and projection system formed by projection 33 and groove 34. Therefore tapers 31 on piston 11 and 32 on fingers 13 move longitudinally, opening a gap between them so that fingers 13 may move apart radially, releasing riser pipe 4. This opening motion is aided by annular springs 12 fitted into grooves 36 of fingers 13 which exerts a constant outwardly directed force against them.

This force is only a small fraction of the hydraulically applied closing force, and is easily overcome in the closing phase but it is sufficient to cause the opening action because there is very little resistance to the outward movement of fingers 13 as piston 11 retracts.

The method of driving the probe into the earth includes clamping and unclamping the vibratory unit 3/clamp 5 assembly to riser pipe 4 by the application of hydraulic fluid from a remote location; pressurized flow into the unit causes clamping, releasing the pressure allows spring 15 to displace the oil from the unit and release the clamp.

Relocation of the vibratory unit 3/clamp 5 assembly up or down on riser pipe 4 while the clamp is released is controlled by a separate line or cable from the surface (not shown) fastened to said assembly at any convenient point and hoisted up or down as desired while said assembly is free to slide on riser pipe 4.

Because many different embodiments may be made within the scope of this concept, and because applications other than driving exploratory probes exist, it is to be understood that the details herein are for illustration and should not be interpreted so as to limit the scope of the present invention.

We claim:

1. An apparatus for penetrating the earth and determining physical characteristics at various depths, comprising:

- a driving means for producing linear oscillations with insignificant lateral forces;
- said driving means having a central passage with a remotely operable clamping means in said central passage and with its longitudinal centerline coincident with the line of action of said driving means;
- said clamping means having a central passage for receiving a cylindrical earth penetrating probe with its longitudinal centerline coincident with said centerline of said clamping means;

said clamping means having locking means for alternately locking to and releasing said earth penetrating probe at successively higher points along the probe, allowing said probe to be driven into the earth in stages; and an actuating means positioned at a remote location for operating said locking means unaided by the earth's surface.

2. The apparatus of claim 1 in which the driving means utilizes at least two motor driven linked eccentric weights to provide driving forces.

3. The apparatus of claim 2 in which the driving motors are powered by electricity.

4. The apparatus of claim 2 in which the driving motors are powered by pressurized hydraulic fluid.

5. The apparatus of claim 1 in which the clamping means is hydraulically locked and spring released.

6. The apparatus of claim 1 in which the locking means includes a collet-type clamp.

7. The apparatus of claim 1 in which the earth-penetrating probe has a lower tip designed to reduce penetration effort.

8. A method of driving a probe into the earth, comprising the steps of:

clamping a vibratory driving means on to an earth penetrating probe;

activating the driving means to impart linear oscillations with insignificant lateral forces to the probe to cause the probe to penetrate the earth;

activating means positioned at a remote location to release the driving means from the probe and slide the driving means along the probe unaided by the earth's surface;

reclamping the driving means to the probe at a location spaced from the initial clamping location; and activating the driving means to further drive the probe into the earth.

9. The method of claim 8 including:

locating the probe in a body of water subsurface location.

10. The method of claim 9 including:

remotely activating the clamping means from the surface to perform said clamping, releasing, relocating, and reclamping steps;

11. The method of claim 10 including:

supplying pressurized hydraulic fluid to the driving means to perform said releasing and reclamping steps.

* * * * *

UNITED STATES PATENT AND TRADEMARK OFFICE

CERTIFICATE OF CORRECTION

PATENT NO. : 5,456,325

DATED : October 10, 1995

INVENTOR(S) : Pantermuehl et ai.

It is certified that error appears in the above-indentified patent and that said Letters Patent is hereby corrected as shown below:

ON THE TITLE PAGE:

Column 1, line 4, the following should be inserted:

"The U.S. Government has a paid-up license in this invention and the right in limited circumstances to require the patent owner to license others on reasonable terms as provided for by the terms of Contract No. N00014-89-C-0098 awarded by the Office of Naval Research."

Signed and Sealed this

Second Day of April, 1996

Attest:

BRUCE LEHMAN

*Attesting Officer* *Commissioner of Patents and Trademarks*